A. H. MORRIS.
ADJUSTABLE TOOL AND HEAD.
APPLICATION FILED NOV. 1, 1920.

1,391,564.

Patented Sept. 20, 1921.

Arthur H. Morris,
INVENTOR

BY Victor J. Evans
ATTORNEY

WITNESS: J. W. Ely

UNITED STATES PATENT OFFICE.

ARTHUR H. MORRIS, OF NEWARK, NEW JERSEY.

ADJUSTABLE TOOL AND HEAD.

1,391,564.  Specification of Letters Patent.  Patented Sept. 20, 1921.

Application filed November 1, 1920. Serial No. 421,058.

*To all whom it may concern:*

Be it known that I, ARTHUR H. MORRIS, citizen of the United States, residing at Newark, in the county of Essex and State of New Jersey, have invented new and useful Improvements in Adjustable Tools and Heads, of which the following is a specification.

This invention relates to adjustable boring and turning tools and heads therefor, and the principal object is to provide mechanism of this nature which shall be simple of construction, cheap to manufacture, and highly efficient for the purpose intended.

Another object is to provide a boring or turning tool with gear mechanism whereby the tool may be adjusted accurately according to the requirements of the work.

Another object is to improve and simplify the boring head.

Another object is to provide indicating means for indicating the degree of adjustment effected.

Other objects will appear as the specification proceeds, and the mechanism for accomplishing all of these objects is hereinafter fully described and claimed, and is shown in the accompanying drawing, in which:—

Like characters of reference refer to like parts in all views.

Figure 1:
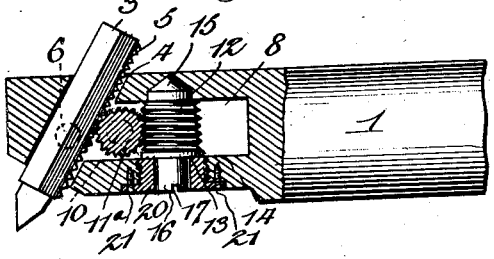
Figure 1 is a fragmentary horizontal sectional view of a boring bar provided with my improvement.
Figure 2:
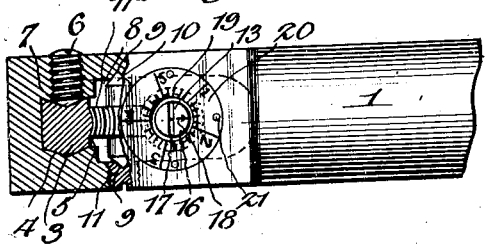
Fig. 2 is a bottom view of the same partly in section.
Figure 3:
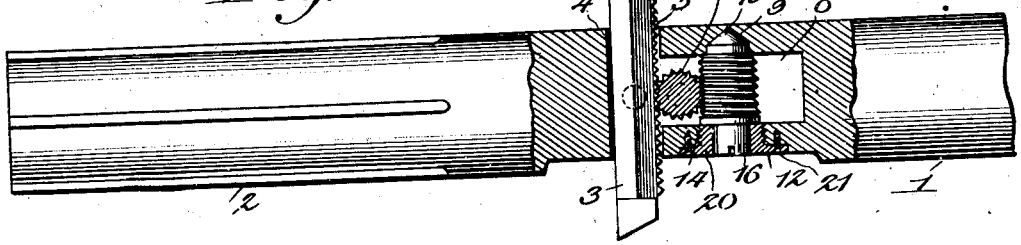
Fig. 3 is a view similar to Fig. 1, but showing my invention as applied to a boring bar having its end extended as a pilot.

Referring to the drawings in detail, 1, Figs. 1, 2 and 3 represents a boring bar which may have its free end extended as in Fig. 3 to form a pilot 2 or may be unprovided with such extension as in Figs. 1 and 2. Mounted in this bar is the boring tool 3 which may be set either at right angles to the longitudinal axis of the bar, as in Fig. 3, or at an angle thereto according to the nature of the work to be performed. The bar 1 is provided with a slideway 4 in which the tool is seated, said slideway having two angular faces one forming a V-shaped depression or channel, and the other forming a corresponding V-shaped rib. The tool 3 is formed with a corresponding V-shaped rib and V-shaped channel to hold the tool firmly seated in the aperture or slideway 4. The tool 3 is also provided on one of its faces with threads 5, and a set screw 6 is threadedly mounted in the bar 1 and is provided at its inner end with a tapered portion 7 adapted to be forced into the V-shaped channel of the tool to hold it firmly in place when adjusted.

A cavity 8 opens out of the way 4 and is provided at one side with a tapered bearing 9, Fig. 2, in which is seated the tapered end of a pin 10, the other end of which has its bearing in a conical depression in the inner end of a set screw 11 threadedly mounted in the bar 1. The pin 10 is formed at its middle portion into a worm gear 11$^a$ which meshes with the threads 5 on the tool 3.

The worm 11$^a$ also meshes with screw threads 12 on a member 13 which is mounted for free rotation in a hole 14 bored in bar 1 and communicating with cavity 8 and provided at its end with a tapered portion 15 in which the tapered end of member 13 is seated. The outer end of member 13 is provided with a shank 16 the exposed face of which has a slot 17 for the reception of the end of a screw driver, and has also an indicating arrow or pointer 18 which is adapted to register with indexes 19 on the outer face of a threaded sleeve 20 which screws into the bar 1 about the shank 16 so as to form the outer bearing of member 13 and also to hold 13 against longitudinal displacement. Set screws 21 hold the sleeve 20 against accidental displacement.

The operation of the mechanism is as follows:—

When the tool is to be adjusted, screw 6 is loosened, and then the member 13 is turned in the desired direction thereby rotating the worm gear 11$^a$ and effecting sliding of the tool in its ways. The amount of adjustment may be accurately measured by the arrow 18 and indexes 19. Screw 6 is then tightened, and the device is ready for the cut.

Figure 4:
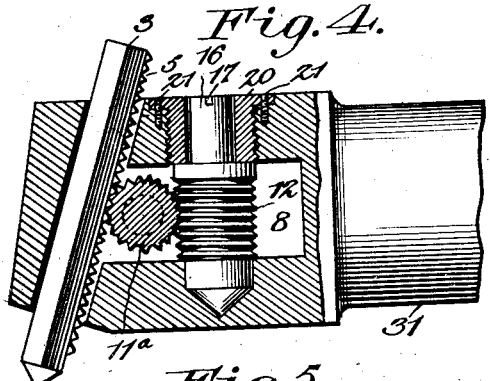
Fig. 4 is a horizontal sectional view of a turning tool holder provided with my improvements.
Figure 5:
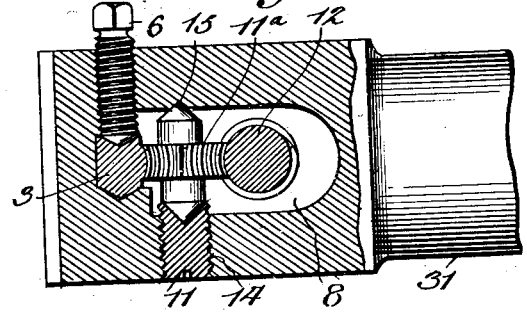
Fig. 5 is a vertical sectional view of the same.

In Figs. 4 and 5, my device is shown as applied to a turning tool holder 31. All of the parts are constructed and operated the same as in the boring tool holder except that screws 6 may be made with heads so as to be operable by a wrench.

It is, of course, understood that the cutting portion of the tool may be ground to any desired shape.

While I have described what I deem to be the most desirable embodiments of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. The combination of a tool holder, a tool slidably mounted therein and provided with a gear rack, a worm gear for coacting with said rack to effect movement of said tool, and means engaging said worm gear and operable for effecting adjusting movements thereof.

2. The combination of a tool holder, a tool slidably mounted therein and provided with a gear rack, a worm gear for coacting with said rack to effect movement of said tool, and an adjusting screw engaging said worm gear and operable for effecting adjusting movements thereof.

3. The combination of a tool holder, a tool slidably mounted therein and provided with a gear rack, a worm gear for coacting with said rack to effect movement of said tool, an adjusting screw engaging said worm gear and operable for effecting adjusting movements thereof, and a collar removably secured in said holder and forming a bearing for one end of said screw.

In testimony whereof I have affixed my signature.

ARTHUR H. MORRIS.